June 23, 1964  A. G. SCHILBERG  3,137,923
METHOD OF FABRICATING A VEHICLE SUSPENSION
MEMBER HAVING INTEGRAL BOLT HOLE
Filed April 8, 1960  2 Sheets-Sheet 1
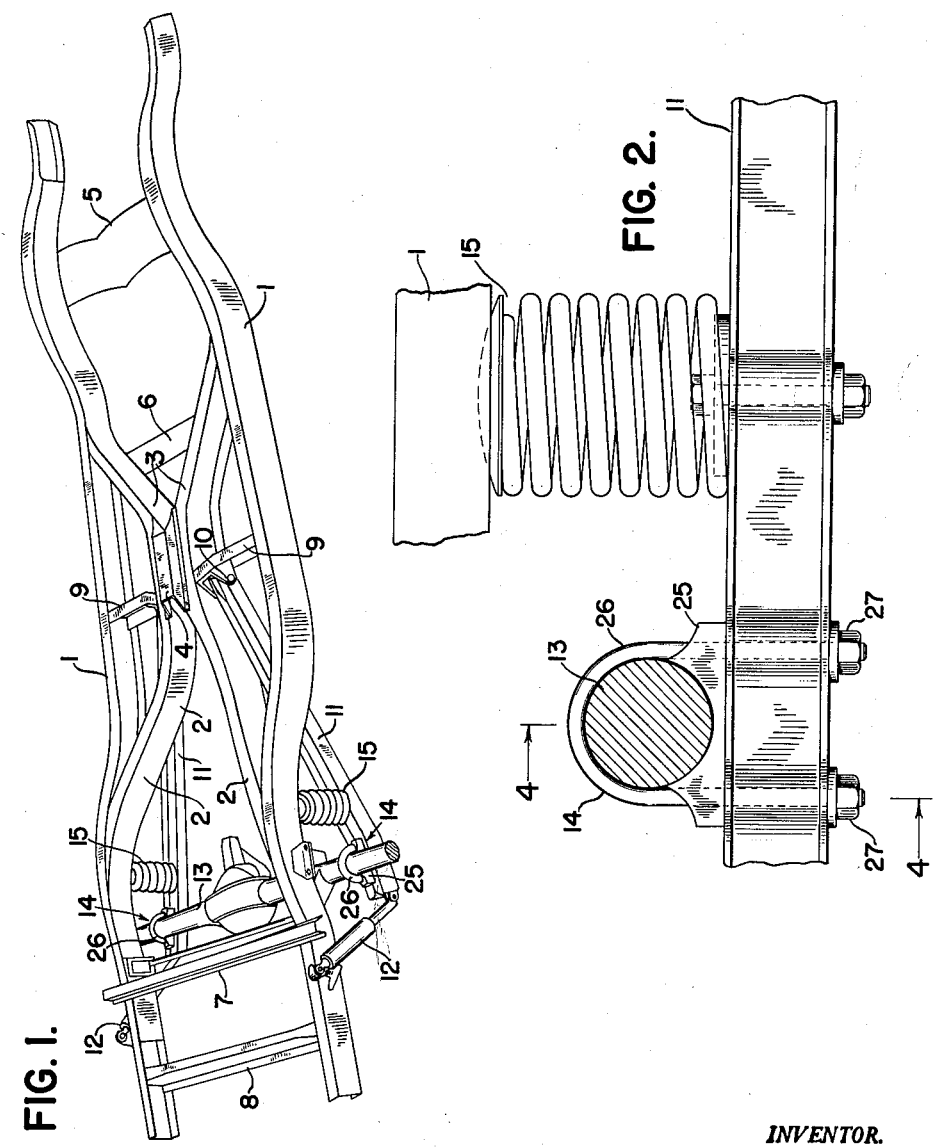
INVENTOR.
ARNOLD G. SCHILBERG
BY
ANDRUS & STARKE
Attorneys June 23, 1964 A. G. SCHILBERG 3,137,923
METHOD OF FABRICATING A VEHICLE SUSPENSION
MEMBER HAVING INTEGRAL BOLT HOLE
Filed April 8, 1960 2 Sheets-Sheet 2
FIG. 3.
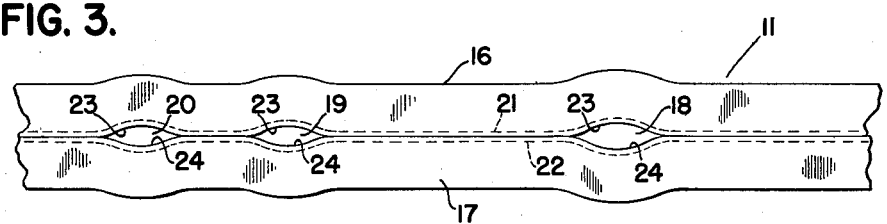
FIG. 4.
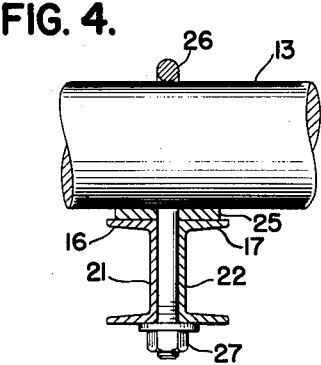
FIG. 6.
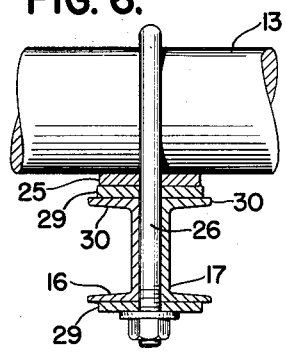
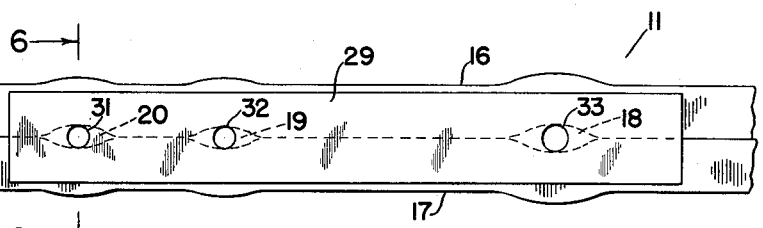
FIG. 5.
*INVENTOR.*
ARNOLD G. SCHILBERG
BY
ANDRUS & STARKE
Attorneys

United States Patent Office 3,137,923
Patented June 23, 1964

3,137,923
METHOD OF FABRICATING A VEHICLE SUSPENSION MEMBER HAVING INTEGRAL BOLT HOLE
Arnold G. Schilberg, Milwaukee, Wis., assignor to A. O. Smith Corporation, Milwaukee, Wis., a corporation of New York
Filed Apr. 8, 1960, Ser. No. 20,894
1 Claim. (Cl. 29—155)

This invention relates to a vehicle suspension member, and more particularly to an I-beam suspension member comprising two channel members having matching sumps in their respective web portions to form cylindrical rigid columns for receiving axle attachment bolts.

In the past, vehicle suspension members were made by forging since it was difficult to form an I-beam of sufficient strength at the connecting points by a stamping process. This was at least in part due to the need for a subsequent drilling step to prepare the connecting points for receiving attachment bolts, since the conventional drilling methods tend to weaken the stamped piece. Because of this problem, suspension members, such as I-beams, were made from forgings and the bolt holes were thereafter drilled in the forged I-beam member as a separate step.

The composite I-beam of this invention is a strong, relatively lightweight structural member. It comprises two channel members welded back-to-back having their web portions in matching alignment. Each web portion is transversely indented at several points along its length, the indentation defining a semi-cylindrical concavity before assembly with a matching web portion having similar indentations. Forming these indentations as part of the channel forming operation produces a "free" bolt hole for the subsequently assembled I-beam. This bolt receiving member is rigid and strong because of its columnar structure and is particularly adapted for receiving attachments connecting a rear truck axle to the composite I-beam design of this invention. Other suspension elements, such as a coil spring, may be attached to the support arm by this bolt receiving means.

Inherent in the forming operation is the automatic spacing of the bolt holes along the length of the composite I-beam member. As the channel member elements are formed, the indentations are formed at intervals determined by the punch and die insert patterns. When the matching channel members are subsequently assembled, automatic spacing between the bolt holes results.

The problem of structural weakness at the connecting points has been overcome since, by the forming method taught here, a rigid column formed in the web of the I-beam receives the attaching bolt. This rigid column provides a strong attachment means between the suspension member of this invention and other chassis components when used in combination with attachment bolts, and permits the use of an I-beam formed from metal stampings. The suspension member, as used to support a truck axle, may be readily disconnected and reconnected by means of the attachment bolts so that maintenance may be performed on the truck axle and replacement of a broken axle is facilitated.

Where extremely heavy load requirements must be met, the suspension member may be modified by securing rectangular metal plates flatwise to the flange portions of the channel members. The metal plates are provided with openings disposed in alignment with the cylindrical sumps, thereby providing a continuous bolt hole through the I-beam and the metal plates.

In the drawings:
FIGURE 1 is a perspective view of a vehicle frame incorporating the axle support arms of this invention;
FIG. 2 is a side elevation of the suspension member of the invention connected to a vehicle axle;
FIG. 3 is a top view of the structure shown in FIG. 2 with the U-bolt and coil spring removed;
FIG. 4 is a section taken on line 4—4 of FIG. 2;
FIG. 5 is a top view of a modified form of the axle support arm and incorporating a reinforcing plate; and
FIG. 6 is a section taken on line 6—6 of FIG. 5, and showing the U-bolt assembly and axle.

As shown in the drawings, the vehicle frame of welded construction includes a pair of channel shaped outer side rails 1 and a pair of channel shaped inner members 2, which are secured to side rails 1 at the end portions of the frame to form generally box-like sections. The central portions 3 of inner members 2 are bent inwardly toward each other and are connected together at the center of the frame by central plates 4 to provide an X-shaped reinforcement. Cross members 5, 6, 7 and 8 are disposed along the length of the frame, each being welded at the ends to side rails 1. In addition, cross bar 9 is secured between the middle portion of each side rail 1 and the corresponding central portion 3 of inner member 2 adjacent central plates 4. Each cross bar 9 carries a bracket 10 disposed immediately adjacent the end of the cross bar 9 which is secured to the central portion 3. Each bracket 10 pivotally receives one end of an axle support arm 11 and the other end of each axle support arm 11 is resiliently connected to the outer side rail 1 by a shock absorbing assembly 12. Each axle support arm 11 extends diagonally back and downwardly from its forward mounting point on the bracket 10 and each is secured to a rear axle 13 by a U-bolt assembly 14. A coil spring suspension member 15 is disposed forward of each U-bolt assembly 14 having one end secured to the outer side rail 1 and the other end secured to the axle support arm 11.

The axle support arms 11 are similar in structure and each arm comprises two channel members 16 and 17 secured back-to-back to form an I-beam. The axle support arms 11 each have a series of bolt holes 18, 19 and 20 disposed between the web portions 21 and 22 of the channel members 16 and 17. The bolt holes 19 and 20 are defined by two matching indented portions 23 and 24 pressed into the web portions 21 and 22 of the channel members 16 and 17. Each indented portion 23 and 24 is disposed transversely through its respective web portion and forms a semi-cylindrical column through the web portion. The indented portions 23 and 24 are disposed in matching alignment, forming the bolt holes 18, 19 and 20.

Bolt hole 18 receives an attachment for the coil spring suspension member 15 while bolt holes 19 and 20 receive the U-bolt assembly 14 which clamps over the rear axle 13 to connect it to the axle support arms 11.

Each U-bolt assembly 14 comprises a support saddle 25, a U-bolt 26 and nuts 27 adapted to provide a slidable bearing surface for the axle 13 at the point of attachment to the axle support arms 11. U-bolt 26 extends through bolt holes 19 and 20 and is held in place by the nuts 27 threadedly received on the ends of the bolt. The support saddle 25 fits onto U-bolt 26 and is held in place by nuts 27. The support saddle 25 and U-bolt 26 define a circular connecting means for axle 13.

To reinforce the axle support arms 11 of the invention, a pair of flat reinforcing plates 29 may be added as shown in FIG. 5 and FIG. 6. The reinforcing plates 29 are secured flatwise to the flanges 30 of the channel members 16 and 17 and are provided with holes 31, 32 and 33, and are in matching alignment with the bolt holes 18, 19 and 20 in the axle support arms 11. The U-bolt 26 and saddle 25 are assembled around the axle 13 as described in the first embodiment. The reinforcing plates 29 substantially strengthen the axle support arms 11 so that the frame may be subjected to a considerably greater load as compared to the possible load for axle support arms 11 without reinforcing plates 29.

Other embodiments are contemplated which are considered within the scope of this invention. For example, an I-beam structure having integral bolt holes as provided by the invention could be used as a structural component for a transmission tower. By changing the spacing of the bolt holes and the number thereof, the advantage of the "free"-bolt hole is obtained in numerous structural applications where the bolt receiving members were formerly drilled or tapped, and automatic spacing of the bolt holes is obtained. The structural member of this invention is particularly suitable for mass production.

Various modes of carrying out the invention are contemplated as being within the scope of the following claims particularly pointing out and distinctly claiming the subject matter which is regarded as the invention.

I claim:

A method of making a relatively lightweight, composite I-beam trailing arm for use in a vehicle suspension system, the steps comprising, forming a first channel member having a web and a pair of flanges from a flat metal blank, simultaneously forming the web and flanges of said first channel member to define a first plurality of semi-cylindrical, longitudinally spaced sumps therein extending transversely of said web and flanges, similarly forming a second channel member having a web and a pair of flanges from a flat metal blank, simultaneously forming the web and flanges of said second channel member to define a second plurality of complementary, longitudinally spaced, semi-cylindrical sumps therein, extending transversely of said web, disposing said first and second channel members back-to-back with the first and second plurality of semi-cylindrical sumps in matched alignment, and welding said first and second channel members permanently together to form a composite I-beam trailing arm having a plurality of integral, ellipsoidal bolt receiving passages defined by the aligned first and second plurality of semi-cylindrical sumps, said bolt receiving passages being disposed transversely through the web portion of said I-beam with substantially no metal upset in the flange portions thereof immediately adjacent said integral bolt receiving passages.

References Cited in the file of this patent

UNITED STATES PATENTS

| | | |
|---|---|---|
| Re. 17,004 | Blakely | June 19, 1928 |
| 1,007,645 | Cookingham | Oct. 31, 1911 |
| 1,013,649 | Grey | Jan. 2, 1912 |
| 1,715,694 | Coddington | June 4, 1929 |
| 1,931,105 | Crawford | Oct. 17, 1933 |
| 2,119,052 | Palmer | May 31, 1938 |
| 2,201,071 | Baugnee | May 14, 1940 |
| 2,567,785 | Rieger | Sept. 11, 1951 |